April 21, 1936.　　　C. A. HARRISON　　　2,037,899
EGG TESTER
Filed July 21, 1934　　　2 Sheets-Sheet 1
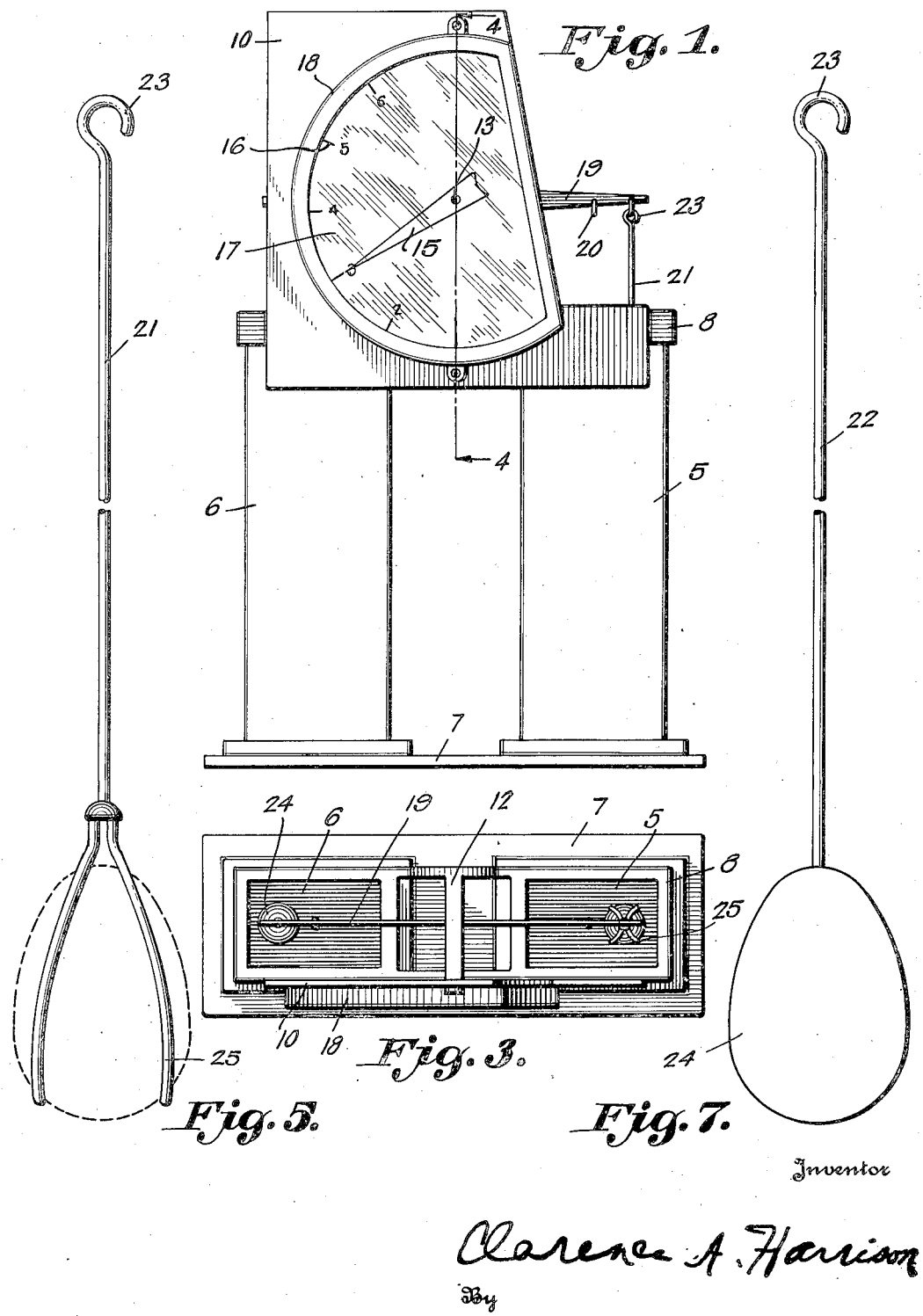

April 21, 1936.  C. A. HARRISON  2,037,899
EGG TESTER
Filed July 21, 1934   2 Sheets-Sheet 2
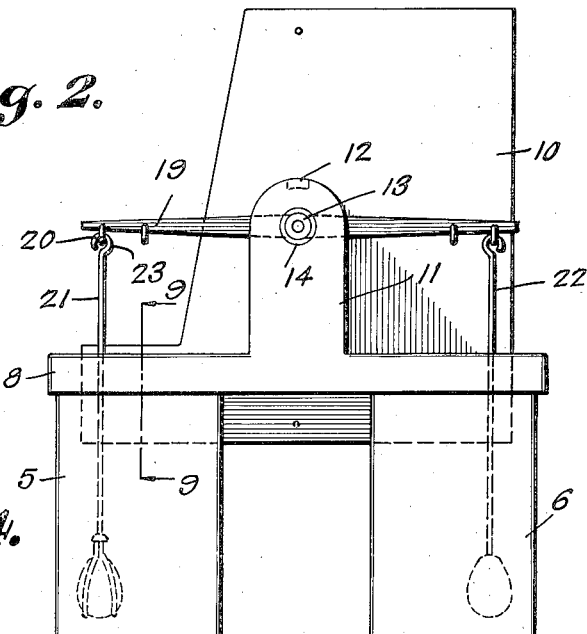
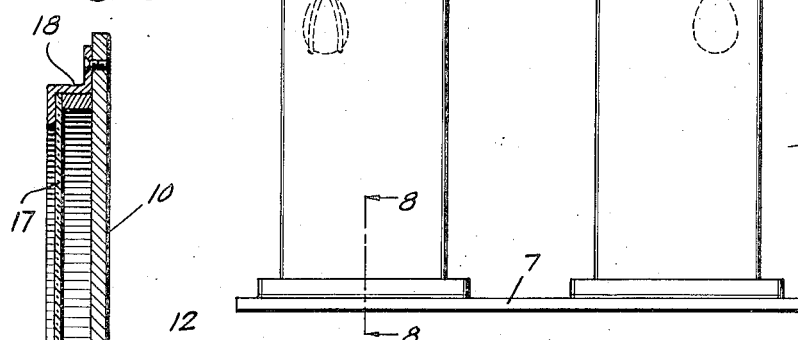
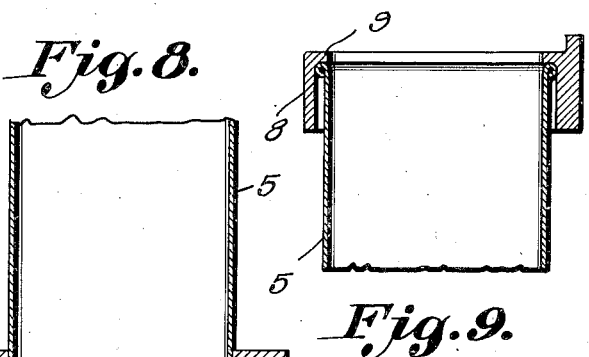
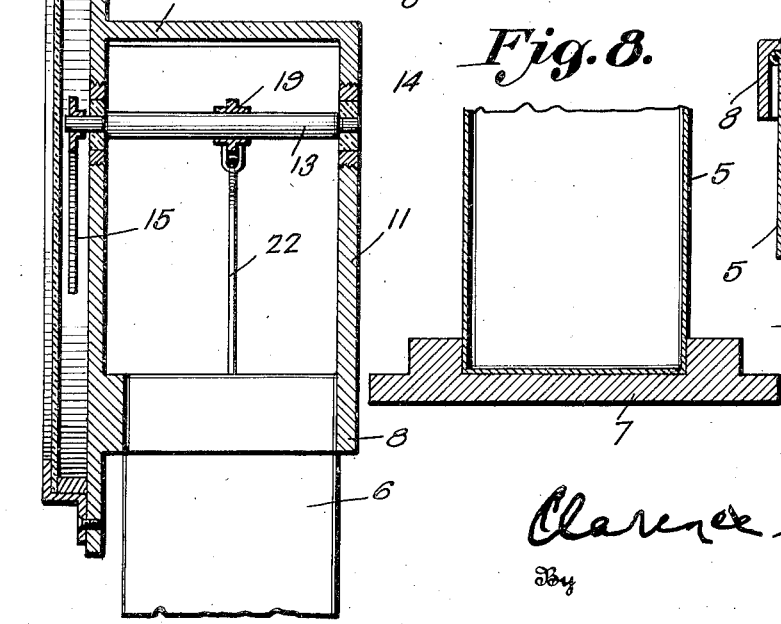
Inventor
Clarence A. Harrison
By
Attorney Patented Apr. 21, 1936

2,037,899

UNITED STATES PATENT OFFICE 2,037,899

EGG TESTER

Clarence Alvin Harrison, Blytheville, Ark., assignor of one-third to Angie Bailey, Blytheville, Ark.

Application July 21, 1934, Serial No. 736,334

1 Claim. (Cl. 265—44)

My invention relates to improvements in egg testing machines and more particularly to a machine for measuring the specific gravity of eggs before placing them in an incubator.

It is an object of the invention to provide a machine of the above-mentioned character which is simple and durable in construction, reliable and efficient in operation and inexpensive to manufacture.

Other objects and advantages of the invention will be apparent during the course of the following description.

In the accompanying drawings, forming a part of this specification and in which like numerals are employed to designate like parts throughout the same, Fig. 1 is a front elevation of the machine, Fig. 2 is a rear elevation of the same, Fig. 3 is a top plan view, Fig. 4 is a vertical section taken on line 4—4 of Fig. 1, Fig. 5 is an enlarged view of the egg supporting member, Fig. 6 is a detail view of the egg supporting member, viewed from a different angle, Fig. 7 is an enlarged view of the counter balance weight, Fig. 8 is a vertical section taken on line 8—8 of Fig. 2, and, Fig. 9 is a vertical section taken on line 9—9 of Fig. 2.

In the drawings, wherein for the purpose of illustration I have shown a preferred embodiment of my invention, the numerals 5 and 6 denote a pair of liquid receptacles which are supported in an upright position on the base plate 7, in spaced parallel relation. An elongated frame 8 fits over the upper ends of the receptacles having an inturned flange 9 at each end which rests on the upper edge of the receptacles. A wall 10 extends upwardly from one of the longitudinal sides of the frame 8 and a standard 11 extends upwardly from the other side of the frame intermediate its ends and is connected to the wall 10 by the cross bar 12. A shaft 13 is journaled in bearings 14 secured in the standard 11 and wall 10, one end of the shaft projecting beyond the wall and having an indicator arm 15 secured thereon, adapted to move around the scale 16 formed on the front of the wall 10. The scale 16 and indicator arm 15 are covered by the glass window 17 secured in the frame 18 attached to the wall 10. A balance beam 19 is fixedly mounted on the shaft 13 having its ends extending over the receptacles 5 and 6. Rings 20 are attached to each of the ends of the beam 19 and rods 21 and 22 having hooks 23 at one end are suspended from the rings and extend downwardly into the receptacles. A counter balance weight 24, of the same size and shape of an egg is attached to the lower end of the rod 22. The lower end of the rod 21 has a pair of spring wire loop members 25 extending longitudinally therefrom in spaced parallel relation, adapted to resiliently grasp an egg of any size or shape and support it in suspended relation within the receptacle 5.

In use, the receptacles 5 and 6 are both filled with water. The rod 22 carrying the counter weight 24 is attached to one end of the beam 19 so that the weight is suspended in the water in the receptacle 6. Then the egg to be tested is placed between the loop members 25 of the rod 21 which is connected to the other end of the beam 19 so that the egg is suspended in the water in the receptacle 5. If the egg has a large, rich, nutritious yoke it will sink down in the water, rocking the beam 19 which turns the shaft 13 and causes the indicator arm 15 to register on the scale 16. Thus, it is seen eggs may be easily and quickly tested to determine their specific gravity.

It is to be understood that the form of my invention herewith shown and described is to be taken as a preferred example of the same and that certain changes in the shape, size and arrangement of the parts may be made without departing from the spirit of the invention or the scope of the subjoined claim.

Having thus described my invention, I claim:—

In an egg testing machine, a base plate, a pair of receptacles supported by said base plate in vertical spaced parallel relation adapted to contain water, an elongated open frame mounted on the upper edge of said receptacles, a standard extending upwardly from one longitudinal edge of said frame intermediate its ends, a vertical wall extending upwardly from the opposite edge of said frame, a shaft disposed transversely of said frame having its ends journaled in said standard and wall, a balance beam fixedly secured on said shaft and extending longitudinally of said frame with its ends disposed over said receptacles, hangers loosely suspended from each end of said beam and extending down into said receptacles, a counter-balance weight attached to the lower end of one of said hangers, an egg supporting member attached to the lower end of the other hanger, an indicator arm mounted on the end of said shaft beyond said wall and a scale on the front face of said wall around which said indicator arm is adapted to move upon rotation of said shaft.

CLARENCE ALVIN HARRISON.